(12) United States Patent
Matsumoto et al.

(10) Patent No.: US 8,513,564 B2
(45) Date of Patent: Aug. 20, 2013

(54) PLASMA WELDING TORCH HAVING A NOZZLE WITH FIRST AND SECOND ORIFICES, AND WELDING METHOD USING PLASMA WELDING TORCH HAVING A NOZZLE WITH FIRST AND SECOND ORIFICES

(75) Inventors: Katsuya Matsumoto, Tochigi (JP); Jun Kitagawa, Tochigi (JP); Keishi Setoda, Tochigi (JP); Yusuke Muramatsu, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 306 days.

(21) Appl. No.: 13/026,558

(22) Filed: Feb. 14, 2011

(65) Prior Publication Data
US 2011/0210102 A1    Sep. 1, 2011

(30) Foreign Application Priority Data
Mar. 1, 2010 (JP) ................................. 2010-043689

(51) Int. Cl.
*B23K 10/00* (2006.01)
(52) U.S. Cl.
USPC ............ 219/121.46; 219/121.45; 219/121.39; 219/121.5; 219/121.51; 219/75
(58) Field of Classification Search
CPC .................................. B23K 9/16; B23K 10/00
USPC ............ 219/121.39, 121.45, 121.5, 121.51, 219/121.59, 74, 75, 137 R, 137.42
See application file for complete search history.

(56) References Cited

U.S. PATENT DOCUMENTS

| 4,777,343 | A | * | 10/1988 | Goodwin | 219/121.5 |
|---|---|---|---|---|---|
| 5,235,155 | A | * | 8/1993 | Yamada et al. | 219/121.39 |
| 5,317,126 | A | * | 5/1994 | Couch et al. | 219/121.51 |
| 6,060,690 | A | * | 5/2000 | Tyagi | 219/137.42 |
| 6,337,460 | B2 | * | 1/2002 | Kelkar et al. | 219/121.5 |
| 7,241,965 | B2 | * | 7/2007 | Burt et al. | 219/121.63 |

FOREIGN PATENT DOCUMENTS

JP   2008-238242   10/2008

* cited by examiner

*Primary Examiner* — Mark Paschall
(74) *Attorney, Agent, or Firm* — Rankin, Hill & Clark LLP

(57) ABSTRACT

A plasma welding torch that can be reduced in size more than in conventional cases. When an inert gas G such as argon gas is supplied to an outer circumferential space around a non-consumable electrode 13, a portion of the inert gas G is used as plasma gas GP that forms a plasma arc PA between the non-consumable electrode 13 and a base material 2 via a plasma orifice 51. A plasma welding torch 1 moves, maintaining this state, in the direction of the arrow shown in FIG. 4. Meanwhile, a portion of the inert gas G supplied to a gas flowing part 21 is not used as the plasma gas GP but is used as shielding gas GS and is ejected onto the base material 2 ahead in the welding direction via a shielding orifice 52. The welding on the base material 2 is performed in a state where the plasma arc PA and the base material 2 are shielded from the air by this shielding gas.

6 Claims, 4 Drawing Sheets

PLASMA WELDING TORCH HAVING A NOZZLE WITH FIRST AND SECOND ORIFICES, AND WELDING METHOD USING PLASMA WELDING TORCH HAVING A NOZZLE WITH FIRST AND SECOND ORIFICES

This application is based on and claims the benefit of priority from Japanese Patent Application No. 2010-043689 filed on Mar. 1, 2010, the content of which is incorporated herein by reference.

BACKGROUND OF THE INVENTION

1. Field of the Invention

The present invention relates to a plasma welding torch that performs plasma arc welding on a base material and a welding method using the plasma welding torch, and more particularly relates to a plasma welding torch that can be made in a size smaller than in conventional cases, and a welding method using the plasma welding torch.

2. Related Art

Conventionally, there is known a technology of welding a base material using a plasma arc formed between a non-consumable electrode and the base material (For example, see Japanese Unexamined Patent Application Publication No. 2008-238242). Such welding is generally referred to as "plasma arc welding".

In plasma arc welding, a plasma welding torch that contains a non-consumable electrode is employed.

A conventional plasma welding torch is supplied with plasma gas together with shielding gas in order to form a plasma arc between the non-consumable electrode and the base material. By ejecting such shielding gas from the conventional plasma welding torch, the molten weld pool that is formed on the base material is prevented from oxidation and, as a result, the quality of welding is maintained.

For this purpose, a conventional plasma welding torch is provided with a nozzle for plasma gas and a nozzle for shielding gas in such a manner that the nozzle for plasma gas surrounds the non-consumable electrode and the nozzle for shielding gas surrounds the nozzle for plasma gas. This means that the conventional plasma welding torch has a dual nozzle structure.

SUMMARY OF THE INVENTION

However, there is a need to perform plasma arc welding on a base material provided in a narrow space, and since the conventional plasma welding torch has a dual nozzle structure as described above, the diameter of a tip thereof is large. This means that, in order to satisfy such a need, a plasma welding torch of a smaller size is required.

The present invention relates to a plasma welding torch that performs plasma arc welding on a base material and a welding method using the plasma welding torch, and it is an object of the present invention to provide a plasma welding torch that can be made in a size smaller than in conventional cases, and a welding method using the plasma welding torch.

A plasma welding torch (for example, the plasma welding torch 1 in an embodiment), according to the present invention, includes:

a non-consumable electrode (for example, a non-consumable electrode 13 in the present embodiment) that forms a plasma arc between a base material (for example, a base material 2 in the present embodiment) and the non-consumable electrode; and a nozzle (for example, a nozzle in the present embodiment), through which inert gas flows, the nozzle including:

a first orifice (for example, a plasma orifice 51 in the present embodiment) having the non-consumable electrode accommodated therein, and being open to the outside; and a second orifice (for example, a shielding orifice 52 in the present embodiment) extending along a direction at a predetermined angle with the non-consumable electrode from a part of the first orifice, and being open to the outside; wherein the inert gas flows through the first orifice when the plasma welding torch moves in a predetermined direction with respect to the base material, a portion of the inert gas, as plasma gas, causes a plasma arc to be formed between the base material and the non-consumable electrode through the first orifice, and a portion of the rest of the inert gas is ejected as shield gas onto at least the base material in the predetermined direction through the second orifice.

According to the present invention, there is provided a nozzle having a first orifice and a second orifice, a portion of inert gas supplied to the first orifice is used as plasma gas, and a portion of the rest, ejected through the second orifice, is used as shielding gas.

With this, the need for the nozzle for shielding gas in a conventional plasma welding torch is obviated. That is, with only a nozzle, corresponding to the nozzle for plasma gas in the conventional plasma welding torch, it is possible to supply shielding gas as well as plasma gas.

As a result, it becomes possible to configure a plasma welding torch, which can perform welding of good quality, in a size smaller than in conventional cases.

The welding method according to the present invention is a welding method using the plasma welding torch according to the present invention described above. Therefore, it is possible to perform quality welding using a smaller plasma welding torch than in conventional cases.

DETAILED DESCRIPTION OF THE INVENTION

The following describes an embodiment of the present invention with reference to the drawings.

Figure 1:
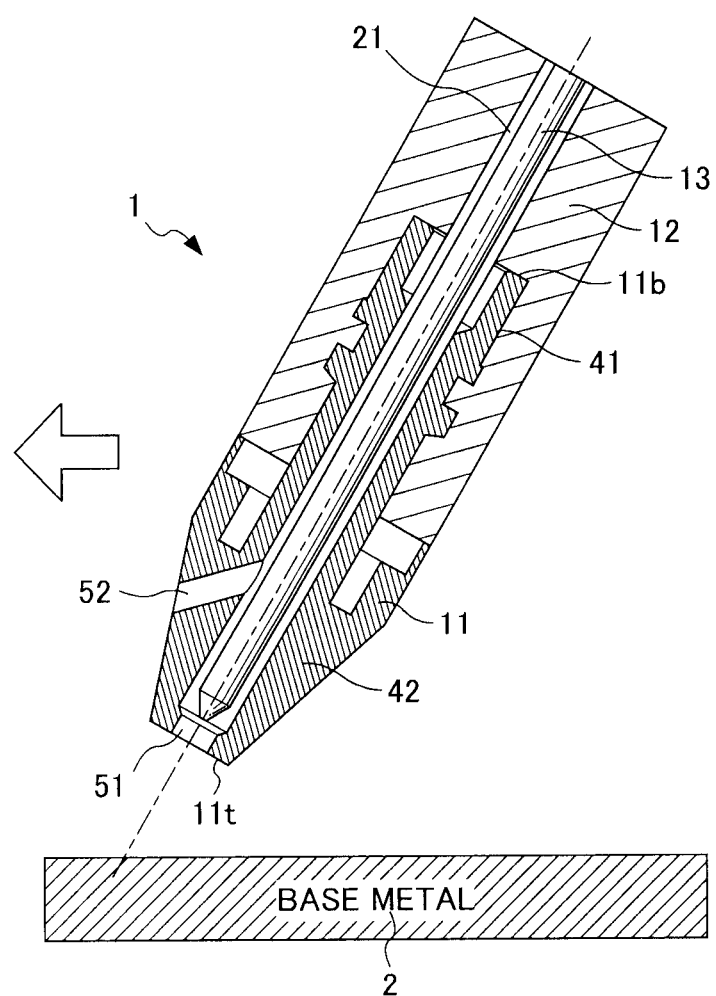
FIG. 1 is a sectional view showing an outline structure of a plasma welding torch according to an embodiment of the present invention.

FIG. 1 is a sectional view showing an outline structure of the plasma welding torch 1 according to an embodiment of the present invention.

The plasma welding torch 1 is provided with a nozzle 11, a torch main body 12, and a non-consumable electrode 13 such as a tungsten electrode.

Figure 2:
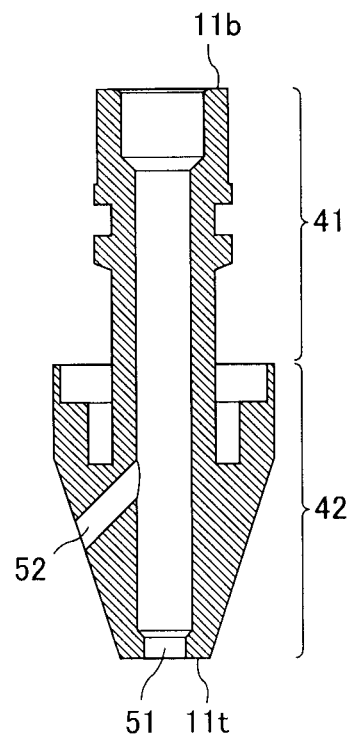
FIG. 2 is a sectional view showing an internal outline structure of a nozzle of the plasma welding torch shown in FIG. 1.
Figure 3:
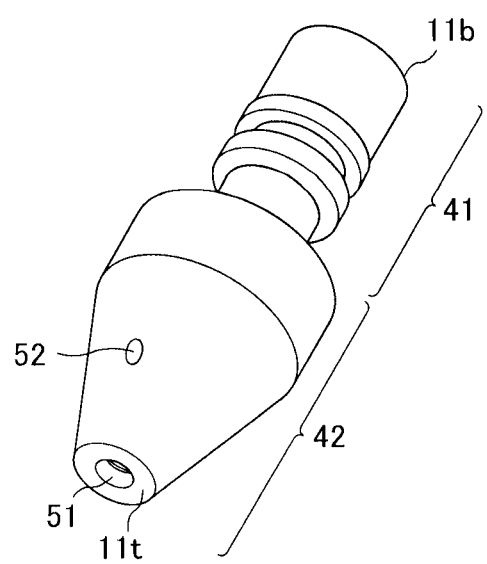
FIG. 3 is a perspective view showing an external outline structure of the nozzle of the plasma welding torch shown in FIG. 1.

FIG. 2 is a sectional view showing an internal outline structure of the nozzle 11. FIG. 3 is a perspective view showing an external outline structure of the nozzle 11.

Here, among the ends of the nozzle 11, an end 11t that faces a base material 2 when the plasma welding torch 1 performs welding on the base material 2 is hereinafter referred to as "tip end 11t", and an end 11b of the nozzle 11 on the opposite side of the tip end 11t is hereinafter referred to as "base end 11b".

The nozzle 11 is provided with a connecting member 41 and a tip member 42, in the direction from the base end 11b to the tip end 11t.

The connecting member 41 is threaded into the center within the torch main body 12 to have the nozzle 11 connected to the torch main body 12 as shown in FIG. 1. A plasma orifice 51 is provided passing through the center within the connecting member 41 and the tip member 42 from the base end 11b to the tip end 11t. The plasma orifice 51 and a space provided in the center inside of the torch main body 12 defines a gas flowing part 21 where inert gas, which will be described later, flows.

This means that the gas flowing part 21 including the plasma orifice 51, which has a non-consumable electrode 13 accommodated therein, extends along and substantially in parallel with the non-consumable electrode 13, and opens to the outside at the tip end 11t of the nozzle 11.

In the tip member 42, there is further provided a shielding orifice 52 that extends along a direction at a predetermined angle with the non-consumable electrode 13, from a portion of the gas flowing part 21 and opens to the outside at the side of the tip member 42.

Here, the white arrow direction shown in FIG. 1 is the direction in which the plasma welding torch 1 moves when welding the base material 2 and is hereinafter referred to as "welding direction".

Details will be described later, but when the plasma welding torch 1 welds the base material 2 in a state in which the plasma welding torch 1 is disposed so that the opening of the shielding orifice 52 faces in the welding direction, a portion of the inert gas flowing through the gas flowing part 21 turns into plasma gas, and a plasma arc is formed between the non-consumable electrode 13 and the base material 2 through the plasma orifice 51. Also, a portion of the rest of the inert gas flowing through the gas flowing part 21 is ejected as shielding gas onto the base material 2 in the welding direction through the shielding orifice 52.

In the following, the above operation of the plasma welding torch 1 will be described with reference to FIG. 4.

Figure 4:
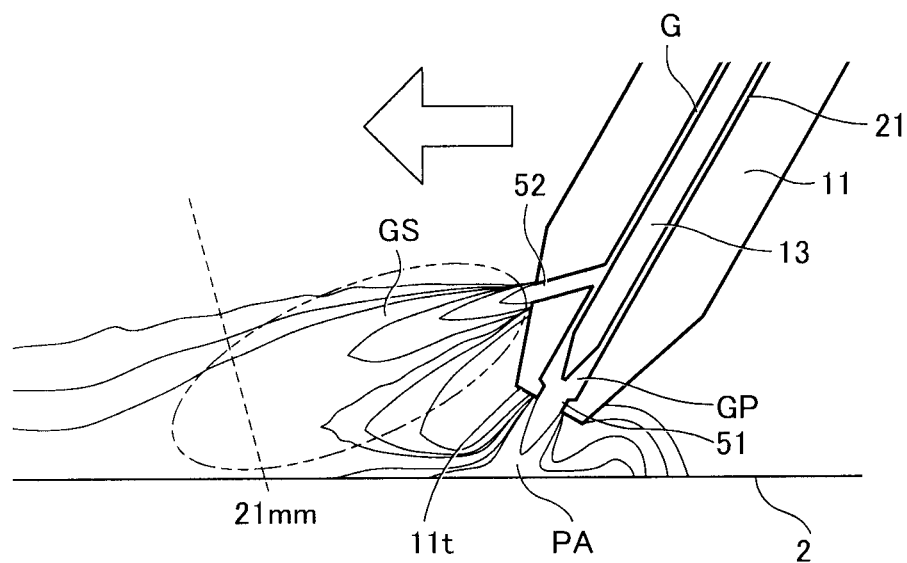
FIG. 4 is a view showing flow of inert gas ejected when the plasma welding torch shown in FIG. 1 performs welding on a base material.

FIG. 4 is a view showing flow of inert gas G ejected when the plasma welding torch 1 performs welding on the base material 2

As shown in FIG. 4, a small amount of inert gas G such as argon gas is supplied to the gas flowing part 21, which is an outer circumferential space around the non-consumable electrode 13, and high voltage is applied between the non-consumable electrode 13 and the nozzle 11 by way of a power-supply unit (not shown), for example. Then, a low current pilot arc is formed between the non-consumable electrode 13 and a vicinity of the plasma orifice 51 at the tip end 11t of the nozzle 11.

In such a state, a plasma arc PA is formed by increasing the flow rate of the inert gas G up to a level where rapid ejection from the plasma orifice 51 occurs, and, for example, by applying high voltage between the non-consumable electrode 13 and the base material 2 by way of a power-supply unit (not shown).

Maintaining this state, the plasma welding torch 1 moves in the welding direction, i.e., in the white arrow direction shown in FIG. 4, by way of a drive mechanism (not shown).

Meanwhile, a portion of the inert gas G supplied to the gas flowing part 21 is not used as plasma gas GP but as shielding gas GS and is ejected onto the base material 2 ahead in the welding direction via the shielding orifice 52. As shown in FIG. 4, the base material 2 is welded in a state in which the plasma arc PA and the base material 2 are shielded from air by such shielding gas GS.

It is to be noted that in the example of FIG. 4 the inert gas G is argon, the moving speed of the plasma welding torch 1 is 0.5 m/min, the flow rate of the inert gas G (the source flow rate, which will be described later) is 2 l/min, and the density of the shielding gas GS at around 21 mm ahead of the plasma welding torch 1 is about 25%.

In this way, in the plasma welding torch 1 of the present embodiment, a portion of the inert gas G supplied to the gas flowing part 21 is used as the plasma gas GP, and a portion of the rest is used as the shielding gas GS.

Here, in order to obtain an appropriate penetration depth in a molten weld pool of the base material 2, it is necessary that the plasma arc PA fully realizes an ability (hereinafter, referred to as "penetration performance") to melt and penetrate the base material 2 by appropriately adjusting flow rate (hereinafter, referred to as "plasma gas flow rate") of the plasma gas GP.

On the other hand, in order to prevent the molten weld pool of the base material 2 from oxidation and ensure the quality of welding, i.e., the quality in terms of blow holes and appearance of the base material 2 after welding, it is necessary that the shielding gas GS fully realizes an ability (hereinafter, referred to as "shielding performance") to shield the plasma arc PA and the base material 2 from air by appropriately adjusting flow rate (hereinafter, referred to as "shielding gas flow rate") thereof.

Therefore, in order to realize both the desired penetration and shielding performances, it is necessary that both the plasma gas flow rate and the shielding gas flow rate are appropriately adjusted.

To this end, it is necessary to appropriately control the flow rate (hereinafter, referred to as "source flow rate") of the inert gas G supplied to the gas flowing part 21 and the portion ratio (hereinafter, referred to as "gas portion ratio") of the source flow rate between the plasma gas flow rate and the shielding gas flow rate.

The plasma gas flow rate depends on the opening area of the plasma orifice 51 from where the plasma gas GP is ejected. Similarly, the shielding gas flow rate depends on the opening area of the shielding orifice 52 from where the shielding gas GS is ejected. Therefore, the gas portion ratio can be modified by changing the opening area ratio of the plasma orifice 51 and the shielding orifice 52.

Summarizing the above, appropriate plasma gas flow rate and shielding gas flow rate can be ensured to the degree that the desired penetration and shielding performance are both realized, by appropriately controlling the source flow rate and the opening area ratio of the plasma orifice 51 and the shielding orifice 52.

Furthermore, in the following, a method of controlling the source flow rate and the opening area ratio of the plasma orifice 51 and the shielding orifice 52 will be described with reference to FIG. 5.

Figure 5:
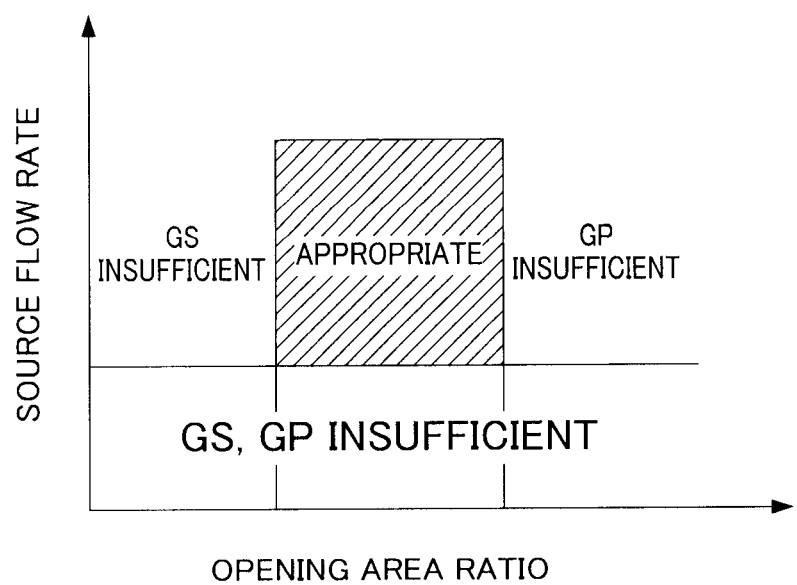
FIG. 5 is a diagram illustrating one example of a relationship between source gas flow rate and opening area ratio between a first orifice and a second orifice of the nozzle in relation to plasma gas flow rate and shielding gas flow rate in the plasma welding torch shown in FIG. 1.

FIG. 5 illustrates one example of the relationship between source flow rate and opening area ratio between the plasma orifice 51 and the shielding orifice 52, in relation to plasma gas flow rate and shielding gas flow rate.

In FIG. 5, the range described as "appropriate" denotes a range where the plasma gas flow rate and the shielding gas flow rate can be appropriately ensured to a degree such that the desired penetration and shielding performances can be both realized.

The range described as "GS insufficient" denotes a range where the shielding gas flow rate required to realize the desired shielding performance cannot be ensured.

The range described as "GP insufficient" denotes a range where the plasma gas flow rate required to realize the desired penetration performance cannot be ensured.

The range described as "GS, GP insufficient" denotes a range where both the shielding gas flow rate required to realize the desired shielding performance and the plasma gas flow rate required to realize the desired penetration performance cannot be ensured.

Therefore, it becomes possible to ensure both an appropriate plasma gas flow rate and an appropriate shielding gas flow rate to a degree such that the desired penetration and shielding performances can be both realized, by controlling the source flow rate and the opening area ratio between the plasma orifice 51 and the shielding orifice 52 to be within the range described as "appropriate".

Here, the opening area of the plasma orifice 51, corresponding to what is referred to as a nozzle hole, is determined by the specification of the nozzle hole diameter. Therefore, the opening area of the shielding orifice 52 can be modified in order to modify the opening area ratio between the plasma orifice 51 and the shielding orifice 52.

Figure 6A:
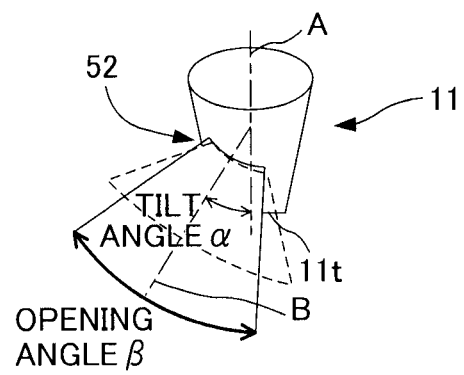
FIG. 6 is a set of views describing a factor specifying opening area of the second orifice of the nozzle of the plasma welding torch shown in FIG. 1.
Figure 6B:
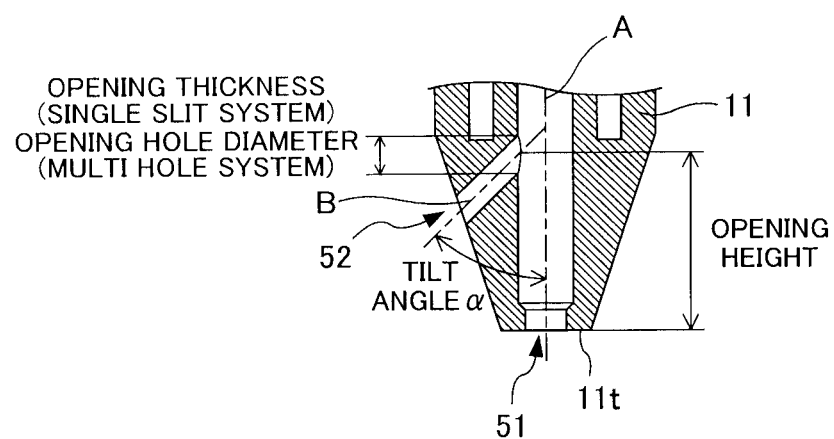

FIG. 6 is a view describing a factor specifying an opening area of the shielding orifice 52. FIG. 6A is a perspective view of the nozzle 11, and FIG. 6B is a sectional view of the nozzle 11.

The opening angle β shown in FIG. 6A is an angle indicative of horizontal spread of the opening of the shielding orifice 52. That is, defining the intersection of the axis A of the plasma orifice 51 and the axis B of the shielding orifice 52 as a starting point and the two horizontal ends of the opening of the shielding orifice 52 as end points, the angle made by two line segments between the starting point and the respective end points coplanar with the axis B of the shielding orifice 52 is the opening angle β.

There are cases in which the opening of the shielding orifice 52 is formed by a single slit, i.e., continuously open between both horizontal ends of the opening. In such a case, the opening area of the shielding orifice 52 depends on the opening angle β shown in FIG. 6A and the opening thickness shown in FIG. 6B. Here, the opening thickness denotes the vertical thickness of the opening of the shielding orifice 52. Therefore, by changing at least one of the opening angle β and the opening thickness, the opening area of the shielding orifice 52 can be modified and, as a result, the opening area ratio between the plasma orifice 51 and the shielding orifice 52 can be modified.

Alternatively, there are cases in which the opening of the shielding orifice 52 is formed by a plurality of holes (hereinafter, referred to as "opening holes"), i.e., holes discontinuously formed in between the two horizontal ends of the opening. In such a case, factors specifying the opening area of the shielding orifice 52 are the opening angle β shown in FIG. 6A and the number and diameters of the plurality of opening holes shown in FIG. 6B. Therefore, by changing at least one of the opening angle β and the number and diameters of the plurality of opening holes, the opening area of the shielding orifice 52 can be modified and, as a result, the opening area ratio between the plasma orifice 51 and the shielding orifice 52 can be modified.

It is to be noted that the tilt angle α and the opening height shown in FIG. 6 are factors which specify the range of the base material 2 where the shielding gas GS reaches. Here, the tilt angle α denotes the angle between the axis A of the plasma orifice 51 and the axis B of the shielding orifice 52. The opening height denotes the vertical length from the tip end 11t of the nozzle 11 to the intersection of the axis A of the plasma orifice 51 and the axis B of the shielding orifice 52.

According to the present embodiment, the following effects can be obtained.

The nozzle 11 is provided with the plasma orifice 51 and the shielding orifice 52. A portion of the inert gas G supplied to the plasma orifice 51 is used as the plasma gas GP, and a portion of the rest, ejected from the shielding orifice 52, is used as the shielding gas GS.

With this, the need for the nozzle for shielding gas provided in the conventional plasma welding torch is obviated. That is, with only the nozzle 11, corresponding to the nozzle for plasma gas provided in the conventional plasma welding torch, it is possible to supply the shielding gas GS as well as the plasma gas GP.

As a result, it is possible to configure the plasma welding torch 1, which can perform welding of good quality, in a size smaller than in conventional cases.

It should be noted that the present invention is not limited to the embodiment described above, and variations, improvements and the like within a scope in which the object of the present invention can be achieved are included in the present invention.

For example, the forming location, and the number, form, shape, or the like of the shielding orifice 52 of the nozzle 11 are not limited to the example shown in the drawings described above, and any type of orifice will suffice so long as shielding gas can be ejected at least in the welding direction. Therefore, for example, the shielding orifice 52 may be formed in the nozzle 11 so that shielding gas can be ejected in another direction, more specifically, a direction opposite to the welding direction for example, in addition to the welding direction.

For example, although the inert gas G has been described as being argon or the like in the embodiment above, there is no limitation as long as usage is possible as the plasma gas GP and the shielding gas GS, and another inert gas such as helium can be employed.

What is claimed is:
1. A plasma welding torch, comprising:
a non-consumable electrode that forms a plasma arc between a base material and the non-consumable electrode; and
a nozzle, through which inert gas flows,
the nozzle including:
a first orifice having the non-consumable electrode accommodated therein, and being open to the outside; and
a second orifice extending along a direction at a predetermined angle with respect to the non-consumable electrode from a part of the first orifice, and being open to the outside;
wherein
the inert gas flows through the first orifice when the plasma welding torch moves in a predetermined direction with respect to the base material, a portion of the inert gas, as plasma gas, causes the plasma arc to be formed between the base material and the non-consumable electrode through the first orifice, a portion of the rest of the inert gas is ejected, as shield gas, onto at least the base material in the predetermined direction through the second orifice, and an opening area ratio between an opening area of the first orifice and an opening area of a second orifice is set such that, for a predetermined inert gas flow rate and a predetermined plasma torch moving speed in the predetermined direction, a sufficient proportion of the inert gas flows through the first orifice for the plasma arc to melt and penetrate the base material and a sufficient proportion of the inert gas flows through the second orifice for the shield gas to shield the plasma arc and the base material from air.

2. The plasma welding torch according to claim 1, wherein the predetermined angle is less than 90 degrees.

3. The plasma welding torch according to claim 1, wherein the opening area ratio is set such that, when the predetermined inert gas flow rate is 2 l/min and the predetermined plasma torch moving speed is 0.5 m/min in the predetermined direction, the inert gas flow through the second orifice is sufficient to create a density of shield gas of 25% at a position 21 mm ahead of the plasma welding torch in the predetermined direction.

4. A welding method using a plasma welding torch, the plasma welding torch comprising:

a non-consumable electrode that forms a plasma arc between a base material and the non-consumable electrode; and a nozzle, through which inert gas flows, the nozzle including:

a first orifice having the non-consumable electrode accommodated therein, and being open to the outside; and a second orifice extending along a direction at a predetermined angle with respect to the non-consumable electrode from a part of the first orifice, and being open to the outside;

the welding method comprising the steps of:

moving the plasma welding torch in a predetermined direction with respect to the base material;

causing the inert gas to flow through the first orifice;

forming the plasma arc between the base material and the non-consumable electrode, through the first orifice, using a portion of the inert gas as plasma gas; and ejecting a portion of the rest of the inert gas, as shield gas, onto at least the base material in the predetermined direction through the second orifice, an opening area ratio between an opening area of the first orifice and an opening area of a second orifice is set such that, for a predetermined inert gas flow rate and a predetermined plasma torch moving speed in the predetermined direction, a sufficient proportion of the inert gas flows through the first orifice for the plasma arc to melt and penetrate the base material and a sufficient proportion of the inert gas flows through the second orifice for the shield gas to shield the plasma arc and the base material from air.

5. The welding method according to claim 4, wherein the predetermined angle is less than 90 degrees.

6. The welding method according to claim 4, wherein the plasma welding torch is moved at 0.5 m/min in the predetermined direction with respect to the base material, the inert gas is caused to flow through the first orifice at a flow rate of 2 l/min, and the portion of the rest of the inert gas is ejected, as shield gas, onto at least the base material in the predetermined direction through the second orifice such that a density of shield gas output from the second orifice is 25% at a position 21 mm ahead of the plasma welding torch in the predetermined direction.

* * * * *